Sept. 3, 1940.   R. H. FLECKENSTEIN ET AL   2,213,211
METHOD OF PRECIPITATION
Filed July 28, 1938

Raymond H. Fleckenstein
Albert T. Mertes       INVENTORS
BY
John P. Hancock   ATTORNEY Patented Sept. 3, 1940

2,213,211

UNITED STATES PATENT OFFICE 2,213,211

METHOD OF PRECIPITATION

Raymond H. Fleckenstein, Wilmington, and Albert T. Mertes, Newport, Del., assignors to E. I. du Pont de Nemours & Company, Wilmington, Del., a corporation of Delaware Application July 28, 1938, Serial No. 221,866

12 Claims. (Cl. 134—78)

This invention relates to the art of metathesis. More particularly, it relates to the formation of solids by double decomposition of compounds in liquids. Still more particularly, it relates to an improved process for the precipitation of solids from liquids.

Precipitation procedures are used widely for the production of such commodities as blanc fixe, calcium sulfate, lithopone, calcium carbonate, numerous pigment colors, and many other water-insoluble and slightly water-soluble materials. The usual method of producing such materials on the commercial scale is to add a liquid solution or suspension of one reacting compound through a pipe to a reacting liquid in a tank with such control of addition speed, reaction temperature, etc. as is necessary to obtain the physical condition desired in the precipitated materials. The precipitated solids are then usually removed from the mother liquors by filtration and are washed to remove undesirable soluble by-products and/or reactants, and are thereafter heat treated and wet and/or dry milled. In the case of blanc fixe, for example, sodium sulfate solution is added to barium sulfide solution in large agitated tanks. The precipitated barium sulfate is recovered by filtration and is washed as free as possible from the by-product sodium sulfide. In the manufacture of gypsum from hydrated lime and sulfuric acid, a suspension of the lime in water is added to the sulfuric acid solution and the resultant hydrated calcium sulfate is filtered and washed as free as possible from excess sulfuric acid. In the manufacture of lithopone, barium sulfide solution is reacted with zinc sulfate solution forming a precipitate of crude lithopone comprising barium sulfate and zinc sulfide in substantially equimolecular proportions, intimately associated as a composite precipitate. Said crude lithopone slurry is adjusted to the desired pH by addition of small amounts of barium sulfide solution or zinc sulfate solution and is then filtered and the crude lithopone calcined to develop its hiding power, suddenly quenched, and milled to form the finished lithopone of commerce.

The precipitation of crude lithopone has heretofore usually been accomplished by either a batch process, in which a pre-determined amount of one of the solutions, preferably the zinc sulfate solution, is first introduced into a large precipitating tank and then a pre-determined amount of the other solution is added with constant stirring, or by a simultaneous batch process in which both solutions are introduced simultaneously into a large precipitating tank at pre-determined rates, or by a simultaneous continuous process in which the zinc sulfate and barium sulfide liquors are continuously added to a substantially constant volume of crude lithopone pulp in a precipitating tank, while crude pulp is continuously withdrawn from the tank.

The precipitation operation is one of the most important steps in the manufacture of such pigment materials as blanc fixe, calcium sulfate, lithopone, and the like, since it is the step which largely determines such important pigment properties as particle size, texture, etc. The precipitates formed by the usual prior art methods are flocculated to varying degrees due to the extreme variations in local concentrations of the reacting liquids. These flocculates usually enclose portions of the reacting liquids and also of the reaction by-products, and thereby render complete reaction and easy washing impossible. In the case of the blanc fixe example cited, even exhaustive washing to an impractical degree fails to remove the sodium sulfide by-product completely. Furthermore, in the case of gypsum formation, the extreme variations in local concentrations result in local alkalinity with consequent precipitation of iron and other color imparting acid soluble impurities in the sulfuric acid. The herein before mentioned flocculates also have deleterious effects on the physical properties of the final product. For example, in the precipitation of crude lithopone by a simultaneous batch process, in which both solutions are introduced into a large precipitating tank at pre-determined rates, the concentrations of each reacting liquor at the moment of reaction varies over a very wide range. Starting with an empty tank and running in equimolecular proportions of zinc sulfate and barium sulfide, it is obvious that when the tank is practically empty the concentrations of the reacting liquors are greater and the agitation more vigorous than when the tank is nearly filled with slurry toward the end of the precipitation operation. The concentration of the reacting liquors at the moment of reaction, which is determined by the concentration of said liquors entering the precipitating tank, by the position of the inlet pipes, by the composition of the precipitated crude lithopone slurry in said tank, and by the degree of agitation of said slurry, determines the character and particle size of the precipitate formed. As a consequence, the control of pigment particle size in such prior art simultaneous batch processes is difficult, if not impossible. The resulting prior art pigment consists of small particles formed during the first part of the precipitation operation, mixed with large particles formed toward the end of the precipitation, together with particles of optimum particle size formed during the portion of the precipitation operation when precipitation conditions are at an optimum. In practice it has been found that successive strikes made under apparently identical conditions produce crude lithopone which varies considerably in particle size and results in finished lithopones having widely different pigment properties. Another factor which adversely affects the pigment properties of lithopone is the variable composition of barium sulfide liquors employed in the crude lithopone precipitation operation. We have discovered that whereas freshly prepared barium sulfide liquor obtained by lixiviation of fresh black ash is a colorless solution comprising not more than traces of barium polysulfides, said liquor on exposure to air, for even a few hours, becomes quite yellow in color and comprises appreciable quantities of barium polysulfides. The quantity of polysulfide sulfur present is indicated by the intensity of the yellow color. We have discovered that the polysulfide sulfur content of barium sulfide liquors can be determined rapidly and accurately by titration of the hot liquors with standard sodium arsenate solution to a colorless endpoint. The arsenate combines with the polysulfide sulfur to form sodium thioarsenate according to the following equation:

$$BaS_x + (x-1)Na_3AsO_3 \rightarrow BaS + (x-1)Na_3AsO_3S$$

We have found that a convenient method of analyzing barium sulfide liquors for polysulfide sulfur is to titrate 100 cubic centimeters hot barium sulfide liquor with 0.2N $Na_3AsO_3$ to a colorless endpoint when viewed against a white background, when

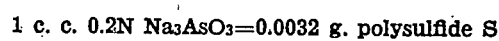

1 c. c. 0.2N $Na_3AsO_3$ = 0.0032 g. polysulfide S

Freshly prepared barium sulfide liquors of the concentrations usually employed in crude lithopone precipitation, namely, from about 15° Bé. to about 30° Bé. concentration, usually contain less than about 0.05 gram polysulfide sulfur per liter. After standing exposed to air for even a few hours, as in storage tanks, the polysulfide sulfur content increases to from about 0.1 to about 0.5 gram per liter. Attempts to avoid formation of polysulfide sulfur in said liquors have been ineffectual or too expensive for practical operation. We have discovered that said polysulfide sulfur deleteriously affects the pigment properties of lithopone prepared therefrom, to a hitherto unrealized extent. During prior art crude lithopone precipitation operations said polysulfide sulfur is released, probably as colloidal sulfur, and is adsorbed on the crude lithopone particles. Upon calcination of said lithopone the sulfur associated therewith reacts with the zinc oxide, normally present in crude lithopone to the extent of from about 0.1% to about 0.3%, thereby destroying said zinc oxide. Prior to the calcination operation the crude lithopone is yellow in color and dries to a hard, gritty mass. After calcination, the resultant lithopone is light colored, but it retains a brownish cast. The pigment is deficient in zinc oxide and is very hard and gritty. As a consequence, the wet milling must be increased on account of the extreme hardness of the pigment. Furthermore, on account of the zinc oxide deficiency the pH of the pigment slurry is low, causing appreciable solution of the metal parts of the ball mill and/or of the flint pebbles used in said mill. As a result, the pigment is seriously degraded in color and in certain instances cannot be sold as standard pigment.

The effect of polysulfide sulfur on lithopone pigment quality is shown in the following table in which are recorded the results obtained when two lithopone samples were prepared in our laboratory from the same barium sulfide and zinc sulfate liquors and under identical conditions, except that in one instance the barium sulfide liquor was employed immediately after it had been prepared and in the second case the barium sulfide liquor was allowed to age for a period of four hours prior to its use.

| BaS liquor | G./l. polysulfide S in BaS liquor | Percent ZnO in calcined lithopone |
|---|---|---|
| Freshly prepared | 0.08 | .22 |
| Aged 4 hours | 0.33 | .06 |

Furthermore, the lithopone prepared from the fresh barium sulfide liquor had excellent color, whereas that prepared from the aged liquor was badly degraded in color.

It has been proposed to remove the sulfur from crude lithopone, obtained from polysulfide sulfur comprising barium sulfide liquors, by washing of said crude lithopone. However, attempts to remove the adsorbed sulfur by washing have been found to be ineffectual. It has also been suggested that the deleterious effects of this adsorbed sulfur could be overcome by addition of zinc oxide to the crude lithopone prior to its calcination. Such treatment has inhibited the deleterious effects of the sulfur contamination to a certain extent. However, since the polysulfide sulfur content of barium sulfide liquors varies over a very wide range, and since as a consequence, the sulfur contamination of the resultant crude lithopones also varies widely, it is difficult, if not impossible when adding zinc oxide to counteract the deleterious effects of the sulfur, to maintain a proper balance between sulfur and zinc oxide in the crude lithopone entering the calcination chamber. Consequently, an extremely non-uniform lithopone pigment is obtained, a portion of which comprises an excess of zinc oxide, and hence causes undue thickening in reactive paint vehicles, and another portion of which is treated with insufficient zinc oxide, and as a consequence is gritty and of poor color.

This invention has as an object the improvement of the conditions of formation of solids from reacting liquids. A further object is the elimination of extreme variations in the local concentrations of the reacting liquids. A still further object is to improve the intimacy of contact between the reacting liquids. A still further object is the double decomposition of essentially all of the reactants. A still further object is the reduction of the flocculation and aggregation of the solid reaction products. A still further object is to improve the washing characteristics of the precipitated materials. A still further object is the improvement of the physical properties of the finished products. A still further object is the production of improved lithopone pigment from polysulfide sulfur contaminated barium sulfide liquors. Additional objects will become apparent from an examination of the following description and claims.

These and other objects and advantages are accomplished by the following invention, which broadly comprises forcing a solution or suspension of one of the reactants in a liquid by means of a jet nozzle through a body of a gas, whereby the film of gas intimately surrounding the solid liquid jet has imparted to it a high inertia by virtue of the same velocity as the liquid jet, and is carried and driven with the liquid jet into the body of the other reacting liquid. The high inertia gas film is sheared from the jet after introduction within the body of said liquid and the gas bubbles dispersed through said body of liquid before being released.

In a more restricted sense this invention comprises forcing a liquid solution or suspension by means of a jet nozzle at a velocity of at least about 40 feet per second, through a body of a gas into the body of the other reacting liquid, said jet nozzle delivering said liquid at less than about 12 inches from the surface of the body of the said liquid.

The preferred embodiment of this invention comprises forcing zinc sulfate liquor and barium sulfide liquor into a body of crude lithopone slurry, through jet nozzles delivering said liquors at less than about 6 inches from the surface of the body of said crude lithopone slurry, at a velocity of at least about 40 feet per second, whereby said liquors are delivered through atmospheric air into the body of said crude lithopone slurry.

In describing our invention in detail, we shall first describe the illustrated precipitation devices embodying it in its preferred forms so far as it relates to apparatus, but although we describe the invention by reference to such illustrated apparatus it will be understood that we do not restrict it thereto. In the accompanying drawing of these precipitation devices:

No. 1 in these figures is a container comprising a body of liquid 2, above which is a body of gas 3. Reacting solution or suspension is forced into jet 4, spaced less than about 6 inches from the surface of the liquid 2, from which jet said solution or suspension emerges at a velocity of at least about 40 feet per second into the body of the gas 3, forming thereby a film of gas around the liquid jet which, due to their velocity, enter into the body of the liquid 2 where the gas is released, thereby agitating the reactants and, in certain instances, combining with undesirable impurities in the reaction mixture.

Figure 1:
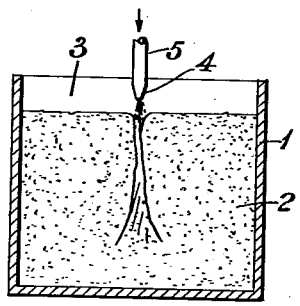
Fig. 1 is a diagrammatic illustration of one arrangement of apparatus adapted for the practice of the invention in a batch precipitation operation.

In practicing our invention in apparatus such as is illustrated in Fig. 1, a pre-determined amount of a solution or suspension of one of the reactants is fed into tank 1. Subsequently, a solution or suspension of the other reactant is forced through conduit 5 into jet 4 from which it is forced at high velocity through the body of air 3 into the liquid in reaction tank 1.

Figure 2:
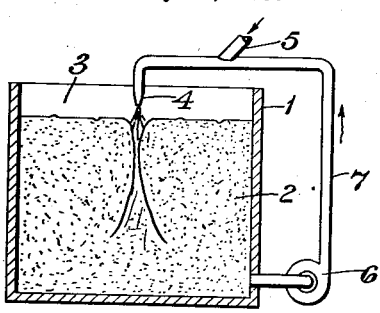
Fig. 2 is a diagrammatic illustration of a slightly modified apparatus also adapted for a batch precipitation operation.

In practicing our invention in apparatus such as is illustrated in Fig. 2, a solution or suspension of one of the reactants is introduced through conduit 5 while the solution or suspension of the other reactant mixed with the reaction products is forced by pump 6 through conduit 7 where it is mixed with the first reactant and discharged through nozzle 4 into the body of liquor 2 in tank 1 through a body of air 3.

Figure 3:
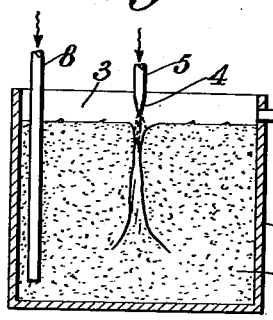
Fig. 3 is a diagrammatic illustration of another arrangement of apparatus adapted for a simultaneous continuous precipitation operation.

In practicing our invention in apparatus such as is illustrated in Fig. 3, wherein precipitation is effected by a simultaneous continuous operation, one of the reactants is flowed continuously at a substantially constant rate into the reaction tank 1 through conduit 8 while the other reacting solution or suspension is forced through conduit 5 and jet 4 through a body of air 3 into the reaction mixture 2. The reaction mixture level in the tank 1 is always kept at a constant point, nearly tank full, and the suspension of reaction product or products is withdrawn continuously through the overflow launder 9.

Figure 4:
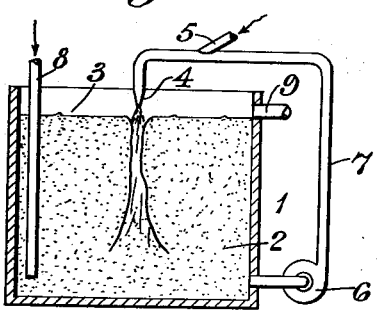
Fig. 4 is a diagrammatic illustration of a slightly modified apparatus also adapted for a simultaneous continuous precipitation operation.

In practicing our invention in apparatus such as is illustrated in Fig. 4, one of the reactants is flowed continuously at a substantially constant rate into the mixing tank 1 through conduit 8, and the reaction mixture is forced by pump 6 at a substantially constant rate through conduit 7 while the other reactant is forced through conduit 5 into conduit 7, the resultant mixture then being forced through jet 4 through a body of air 3 into the reaction mixture 2. The reaction mixture level in the tank 1 is always kept at a constant point, nearly tank full, and the suspension of reaction products is withdrawn continuously through the overflow launder 6.

Figure 5:
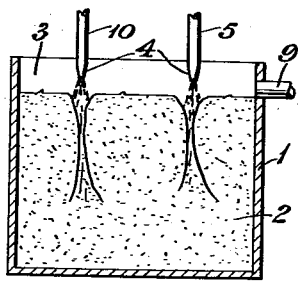
Fig. 5 is a diagrammatic illustration of another arrangement of apparatus adapted for a simultaneous continuous precipitation operation wherein both reactants are forced through jet nozzles into the reaction tank.

In practicing our invention in apparatus such as is illustrated in Fig. 5, which is particularly adapted for the precipitation of crude lithopone, a solution or suspension of one of the reactants is introduced through conduit 5 and the other reactant through conduit 10 into jet nozzles 4, being forced at high velocity through a body of air 3 into the reaction mixture 2. The reaction mixture level in the tank 1 is always kept at a constant point, nearly tank full, and the reaction product suspension is withdrawn continuously through the overflow launder 9.

Figure 6:
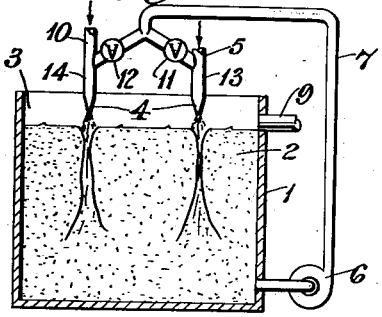
Fig. 6 is a diagrammatic illustration of a slightly modified apparatus particularly adapted for simultaneous continuous precipitation of crude lithopone, wherein both reactants are forced through jet nozzles into the reaction tank.

In practicing our invention in apparatus such as is illustrated in Fig. 6, which is the preferred arrangement of apparatus for the precipitation of crude lithopone, one reactant is introduced through conduit 5 while the other reactant is introduced through conduit 10. The reaction mixture 2 is forced by pump 6 at a pre-determined rate through conduit 7 where a pre-determined proportion of the reaction mixture is forced through valve 11 and mixed in conduit 13 with one of the reactants and the remainder of the reaction mixture is forced through valve 12 and mixed in conduit 14 with the other reactant, both mixtures then being forced through jet nozzles 4, through a body of air 3 into the reaction mixture 2. The reaction mixture level in the tank 1 is always kept at a constant point, nearly tank full, and the reaction product suspension is withdrawn continuously through the overflow launder 9.

Figure 7:
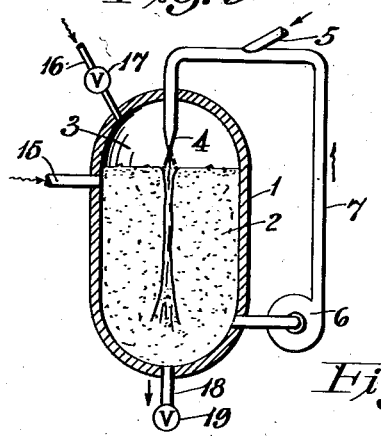
Fig. 7 is a diagrammatic illustration of another arrangement of apparatus, useful particularly for a simultaneous continuous precipitation operation when a gas other than air at atmospheric presssure is employed.
Figure 8:
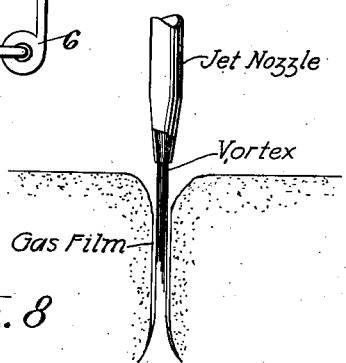
Fig. 8 is a detailed view of the stream of liquid solution or suspension impinging upon the surface of the other reacting liquid.

The apparatus of Fig. 7 is closed so as to permit the employment of gases other than air at atmospheric pressure. It is particularly adapted in instances where it is desired to employ gases at pressures other than atmospheric or to employ gases other than air at atmospheric pressure. In practicing our invention in apparatus such as is illustrated in Fig. 7, one reactant is flowed continuously at a substantially constant rate into the enclosed mixing tank 1 through conduit 15 and the reaction mixture is forced by pump 6 at a substantially constant rate through conduit 7 while the other reactant is forced through conduit 5 into conduit 7, the resultant mixture then being forced through jet 4 through a body of gas 3 into the reaction mixture 2. Additional gas as required is admitted through pipe 16 and valve 17 connected with a supply of the gas. The reaction mixture level in the tank 1 is always kept at a constant point, nearly tank full, and the suspension of reaction products is withdrawn continuously through pipe 18 and valve 19.

Various arrangements and selections of equipment for the operation of our novel process are possible. However, in the preferred arrangement of apparatus for the precipitation of lithopone, illustrated in Fig. 6, we employ a mixing tank 1 having a diameter of 32 inches and a capacity up to the overflow line of 127 gallons, other dimensions being proportionate as shown. The reaction mixture 2 is forced through pump 6 and valves 11 and 12 at substantially constant rates while barium sulfide solution, at a substantially constant temperature in the range of from about 60° C. to about 80° C. containing a substantially constant amount of BaS in the range of from about 150 to about 300 grams BaS per liter, is flowed continuously at a substantially constant rate in the range of from about 35 to about 75 gallons per minute through conduit 10 into conduit 14. The zinc sulfate solution at a substantially constant temperature in the range of from about 40° C. to about 55° C., containing a substantially constant amount of $ZnSO_4$ in the range of from about 300 to about 600 grams $ZnSO_4$ per liter, is flowed continuously into conduit 13 through conduit 5 at a substantially constant rate, such that the pH of the overflow crude lithopone slurry is in the range of from about 3.5 to about 10. The resultant mixtures in conduits 13 and 14 comprising, respectively, zinc sulfate and barium sulfide in excess being forced through jet nozzles 4 and 4, through a body of air 3 into the reaction mixture 2 at velocities of at least about 40 feet per second, said jet nozzles delivering said liquids at less than about 6 inches from the surface of the body of the reaction mixture. Crude lithopone pulp having a substantially constant temperature in the range of from about 65° C. to about 95° C. is allowed to overflow at a substantially constant rate through the overflow launder 9, when it is conducted to a finishing tank where it is then finished in the usual manner, being adjusted to a pH of between about 4 and about 12 by addition of appropriate small amounts of barium sulfide or zinc sulfate solution, and being subsequently filtered, dried, calcined, quenched, wet milled, filtered, dried, and dry milled to provide an improved finished lithopone of commerce.

The following example is given for illustrative purposes and is not intended to place any restriction on the herein described invention:

*Example*

Using an arrangement of apparatus designed as shown in Fig. 4 with the mixing tank 1 having a capacity up to the level of the overflow launder 9 of 127 gallons, and other dimensions being proportionate as shown, 175.2 grams per liter barium sulfide solution comprising 1 gram polysulfide sulfur per liter was fed at a temperature of 78° C. through conduit 8 at a rate of 62.2 gallons per minute, while 350.9 grams per liter zinc sulfate solution at 50° C. was fed through conduit 5 at a rate of 29.6 gallons per minute, the reaction mixture 2 being forced through pump 6 at a rate of 150 gallons per minute. Jet 4 was spaced 3 inches above the body of the reaction mixture 2, the zinc sulfate containing solution being forced out of said jet at a velocity of 50 feet per second through a body of air 3 into the reaction mixture 2. Crude lithopone pulp having a pH of 7 and a temperature of 81° C. was allowed to overflow at a substantially constant rate through the overflow launder 9. Said crude lithopone, which was uniform in particle size and white in color, was adjusted to a pH of 8.8 by addition of appropriate small amounts of barium sulfide solution. Subsequently, it was filtered, dried to 5% moisture content, calcined at 870° C. in a furnace such as described in U. S. Patent 1,584,381, and quenched by spraying with water and immediately thereafter dropping it into a quenching body of water. The calcined lithopone was wet milled, filtered, dried and dry milled. The resultant finished lithopone was of excellent color and texture, contained 0.24% zinc oxide, and was eminently fitted for use in lithopone paint manufacture. A second lot of lithopone was made from the same barium sulfide and zinc sulfate liquors under conditions identical with those existing during the preparation of the hereinabove described novel pigment of our invention, with the exception that during the precipitation operation jet nozzle 4 was replaced by a tube extending below the surface of the reaction mixture. The resultant crude lithopone was yellow in color, and upon calcination and finishing it formed a finished lithopone pigment which contained only 0.05% zinc oxide and was of such poor color and so gritty that it could not be used in lithopone paint manufacture.

It is to be understood that the herein disclosed specific embodiments of our invention may be subjected to variation and modification without departing from the scope of this invention. For instance, while we prefer to employ a precipitating device such as that illustrated in Fig. 6, other types of precipitating devices may be used. Thus, the precipitating devices illustrated in our drawing as well as others may be employed.

The distance of the jet nozzle from the surface of the body of the reaction mixture and the velocity of the reacting liquid being delivered through the jet nozzle may vary widely provided that they are so regulated that a vortex is formed in the reaction mixture. Appreciable effects are obtained when the jet nozzle delivers the liquid stream at a distance of about 12 inches from the surface of the reaction mixture. However, increased effects are obtained at decreased distances and it is preferred to have said jet nozzle deliver said liquid stream at a distance of about 6 inches or less from the surface of the body of said reaction mixture and at a velocity of at least about 40 feet per second.

When practicing our invention in a batch operation in apparatus such as is illustrated in Figs. 1 and 2, it is preferred that the reaction tank 1 have a capacity of as high as about 2000 gallons or more. However, when employing our novel process in a simultaneous continuous precipitation operation in apparatus such as is illustrated in Figs. 3, 4, 5, 6 and 7, it is preferred that the reaction tank 1 have a capacity of not more than about 150 gallons, and further, that the total volume of reactants entering said tank per minute should be not less than about one-third the volume of said tank.

We have found that liquid pressures of from about 30 to about 60 pounds per square inch in the jet are satisfactory for most purposes. With lower pressures the formation of gas bubbles and turbulence created is considerably less than with higher pressures. While turbulence is increased and the quality of the precipitants improved, and in the case of lithopone precipitation, for example, the removal of harmful sulfur compounds expedited by higher pressures, the increased power consumption may not be economical. It is preferred, as stated herein, that the liquid stream emerge from the jet nozzle at a velocity of at least about 40 feet per second.

While it is preferred in most instances that the gas employed shall be air at atmospheric temperature and pressure, it is to be understood that gases other than air, such as nitrogen, carbon monoxide, hydrogen, helium, and the like, which are only very slightly soluble in the liquid, may be employed. Furthermore, while we prefer to employ gases at atmospheric pressure, especially when using air, it is to be understood that subatmospheric pressures and pressures greater than atmospheric may be employed.

The theory of the invention is that the beneficial effects obtained therefrom are due not only to the extremely fine bubbles produced, but are also due to the violent agitation or shearing action of the jet against the liquor, destroying the gas film between the two. Close observation of the nature of the vortex produced where the jet enters the liquor shows a gas space about $\frac{1}{16}$" around the solid jet. This gas space or film extends some distance below the surface and is in some respects an ejector or aspirator made from liquid. A strong suction of gas is produced near the jet as shown by the fact that a match is quickly extinguished when held near the vortex, the flame being drawn into the vortex. In this manner, a combination of gas and liquid is forced into the body of said liquid, so that the gas is released therein and has to travel through a substantial body of said liquid before escaping into the atmosphere. As a consequence, violent agitation of the reactants is obtained with consequent improvement in the quality of the solid reaction products. Furthermore, in cases such as the precipitation of crude lithopone from zinc sulfate and polysulfide sulfur contaminated barium sulfide liquor, the combination of shearing action and fine bubble formation, when employing air as the gas, results in the conversion of the polysulfide sulfur to an innocuous form, probably barium sulfate. This latter result is surprising in view of the fact polysulfide sulfur formation in barium sulfide solutions is accelerated when said solutions are stored in contact with air, as in storage tanks.

While our invention is particularly adapted to the manufacture of crude lithopone pulp from zinc sulfate solutions and barium sulfide solutions, particularly polysulfide sulfur contaminated barium sulfide solutions, it is to be understood that it is also adapted to many other double decomposition precipitation processes. Examples of such processes include the reaction of barium sulfide solution with sodium sulfate solution to precipitate barium sulfate; the reaction of lime slurry with sulfuric acid to precipitate calcium sulfate; the reaction between ammonium sulfide solution and zinc sulfate solution; the reaction between zinc chloride solution and barium sulfide solution; the reaction between barium sulfide solution and barium zincate solution to precipitate zinc sulfide; the reaction between milk of lime and molasses syrup to precipitate calcium sucrate; and, various reactions employed for the precipitation of calcium carbonate, numerous pigment colors, and many other water insoluble and slightly water-soluble materials.

Our process possesses advantages not previously combined in a single precipitation process. Furthermore, the precipitated products of our novel process possess advantages not previously combined in such precipitated commodities. On account of the reduction of the extreme variations in local concentrations of the reacting liquids, contamination of the precipitated solid material with soluble and/or insoluble reactants and/or by-products of the reaction is reduced markedly. Because of the greater intimacy of contact between the reactants, metathesis may be carried essentially to completion. As a consequence, removal of reactants and by-products by washing of the filtered solid reaction products may be effected more readily. Furthermore, aggregation of the precipitated solid material is reduced and its particle size regulated with consequent control of the physical properties of the finished product. Moreover, when applied to the precipitation of crude lithopone, our novel process permits the production of uniform lithopone of desired zinc oxide content and of excellent color and texture from polysulfide sulfur contaminated barium sulfide liquors, which when employed in prior art lithopone precipitation processes result in lithopone pigment deficient in zinc oxide and of poor color and texture.

As many apparently widely different embodiments of this invention may be made without departing from the scope and spirit thereof, it is to be understood that we do not limit ourselves to the specific embodiments thereof except as defined in the appended claims.

Having described the present invention the following is claimed as new and useful.

1. In a process for the formation of solids from reacting liquids the step which comprises forcing a solution of one of the reactants by means of a jet nozzle at a velocity of at least about 40 feet per second through a body of gas into the body of the other reacting liquid, said jet nozzle delivering said liquid at less than about 12 inches from the surface of the body of said liquid.

2. In a process for the production of pigments from reacting liquids the step which comprises forcing a solution of one of the reactants by means of a jet nozzle at a velocity of at least about 40 feet per second through a body of gas into the body of the other reacting liquid, said jet nozzle delivering said liquid at less than about 12 inches from the surface of the body of said liquid.

3. In a process for the production of lithopone the step which comprises forcing a zinc sulfate liquid by means of a jet nozzle at a velocity of at least 40 feet per second through a body of gas into a body of a liquid comprising barium sulfide, said net nozzle delivering said liquid at less than about 12 inches from the surface of the body of the said liquid.

4. In a process for the production of pigments from reacting liquids the step which comprises forcing a solution of one of the reactants by means of a jet nozzle at a velocity of at least about 40 feet per second through a body of gas into the body of the other reacting liquid, said jet having a liquid pressure of between about 30 and about 60 pounds per square inch, and said jet delivering said liquid at less than about 12 inches from the surface of the body of said liquid.

5. In a process for the production of lithopone the step which comprises forcing a barium sulfide liquid by means of a jet nozzle at a velocity of at least 40 feet per second through a body of gas into a body of a liquid comprising zinc sulfate, said jet nozzle delivering said liquid at less than about 12 inches from the surface of the body of said zinc sulfate liquid.

6. In a process for the production of lithopone the step which comprises forcing a barium sulfide liquid by means of a jet nozzle at a velocity of at least 40 feet per second through a body of gas into a body of a liquid comprising zinc sulfate, said jet having a liquid pressure of between about 30 and about 60 pounds per square inch and said jet nozzle delivering said liquid at less than about 12 inches from the surface of the body of said zinc sulfate liquid.

7. In a process for the production of lithopone the step which comprises forcing polysulfide contaminated barium sulfide liquor and a zinc sulfate liquor into a body of a crude lithopone slurry by means of separate jet nozzles at a velocity of at least 40 feet per second, said jets having a liquid pressure of between about 30 and about 60 pounds per square inch and said jet nozzles delivering said liquids at less than about 12 inches from the surface of the body of said lithopone slurry.

8. In a process for the production of lithopone the step which comprises forcing a zinc sulfate liquid by means of a jet nozzle at a velocity of at least 40 feet per second through a body of gas into a body of a liquid comprising barium sulfide, said jet having a liquid pressure of between about 30 and about 60 pounds per square inch and said jet nozzle delivering said liquid at less than about 12 inches from the surface of the body of said zinc sulfate liquid.

9. In a process for the production of pigments from reacting liquids the step which comprises forcing a solution of one of the reactants by means of a jet nozzle at a velocity of at least 40 feet per second through air at atmospheric temperature and pressure into the body of the other reacting liquid, said jet nozzle delivering said liquid at less than about 6 inches from the surface of the body of said liquid.

10. In a process for the production of lithopone the step which comprises forcing a barium sulfide liquid by means of a jet nozzle at a velocity of at least 40 feet per second through air at atmospheric temperature and pressure into a body of a liquid comprising zinc sulfate, said jet having a liquid pressure of between about 30 and about 60 pounds per square inch and said jet nozzle delivering said liquid at less than about 6 inches from the surface of the body of said zinc sulfate liquid.

11. In a process for the production of lithopone the step which comprises forcing a zinc sulfate liquid by means of a jet nozzle at a velocity of at least 40 feet per second through air at atmospheric temperature and pressure into a body of a liquid comprising barium sulfide, said jet having a liquid pressure of between about 30 and about 60 pounds per square inch and said jet nozzle delivering said liquid at less than about 6 inches from the surface of the body of said barium sulfide liquid.

12. In a process for the production of lithopone the step which comprises forcing polysulfide contaminated barium sulfide liquor and a zinc sulfate liquor through a body of gas into a body of a crude lithopone slurry by means of separate jet nozzles at a velocity of at least 40 feet per second, said jets having a liquid pressure of between about 30 and about 60 pounds per square inch and said jet nozzles delivering said liquids at less than about 6 inches from the surface of the body of said lithopone slurry.

RAYMOND H. FLECKENSTEIN.
ALBERT T. MERTES.